(12) United States Patent
Munshi et al.

(10) Patent No.: US 6,469,700 B1
(45) Date of Patent: Oct. 22, 2002

(54) PER PIXEL MIP MAPPING AND TRILINEAR FILTERING USING SCANLINE GRADIENTS FOR SELECTING APPROPRIATE TEXTURE MAPS

(75) Inventors: Aaftab Munshi, Los Gatos; Steven Yang, Fremont, both of CA (US)

(73) Assignee: Micron Technology, Inc., Boise, ID (US)

( * ) Notice: Subject to any disclaimer, the term of this patent is extended or adjusted under 35 U.S.C. 154(b) by 92 days.

(21) Appl. No.: 09/104,160

(22) Filed: Jun. 24, 1998

(51) Int. Cl.$^7$ .............................. G06T 15/00
(52) U.S. Cl. ...................... 345/419; 345/425
(58) Field of Search ................... 345/419, 425, 345/428, 429, 430

(56) References Cited

U.S. PATENT DOCUMENTS

| | | | | |
|---|---|---|---|---|
| 5,224,208 A | * | 6/1993 | Miller, Jr. et al. | 345/430 |
| 5,719,600 A | * | 2/1998 | Alcorn | 345/430 |
| 5,831,624 A | * | 11/1998 | Tarolli et al. | 345/430 |
| 5,953,015 A | * | 9/1999 | Choi | 345/430 |
| 5,986,663 A | * | 11/1999 | Wilde | 345/428 |
| 6,005,583 A | * | 12/1999 | Morrison | 345/430 |

* cited by examiner

Primary Examiner—Cliff N. Vo
(74) Attorney, Agent, or Firm—Dorsey & Whitney LLP (57) ABSTRACT

The number of computations performed in rendering graphics is reduced by computing certain terms only at the beginning of each scanline. A scanline gradient is calculated once at the beginning of each scanline for each of two texture values with respect to the x-coordinate of the scanline. Following the scanline gradient calculations at the beginning of each scanline, a pixel gradient is calculated for each pixel of the scanline with respect to the y-coordinate of the scanline. The sum of the squares of the scanline gradients and the pixel gradients are compared, and the larger of the two quantities is selected to be a maximum Rho constant term for the corresponding pixel, wherein the maximum Rho constant is used to select a texture map for rendering the corresponding pixel. Furthermore, at the beginning of each scanline, a pixel gradient may be calculated for each of two texture values for a first pixel of the scanline with respect to the y-coordinate of the scanline. Derivatives are calculated for the pixel gradients, wherein pixel gradients are found using the derivatives, thereby eliminating the calculation of pixel gradients for each pixel.

31 Claims, 5 Drawing Sheets

PER PIXEL MIP MAPPING AND TRILINEAR FILTERING USING SCANLINE GRADIENTS FOR SELECTING APPROPRIATE TEXTURE MAPS

BACKGROUND OF THE INVENTION

Specifically, the present invention discloses an improved method and apparatus for per pixel MIP mapping and trilinear filtering.

BACKGROUND

Multimedia graphics are typically generated by treating an image as a collection of small, independently controlled dots (or pixels) arranged on a screen or cathode ray tube. A computer graphic image is typically composed of a number of objects rendered onto one background image, wherein each object comprises multiple pixels. Pixels, or 'picture elements', may be viewed as the smallest resolvable area of a screen image. With the area usually rectangular in shape, each pixel in a monochrome image has its own brightness, from 0 for black to the maximum value (e.g. 255 for an eight-bit pixel) for white. In a color image, each pixel has its own brightness and color, usually represented as a triple of red, green and blue intensities. During rendering, the object may be combined with previously generated objects using compositing techniques, wherein compositing is the combining of multiple images by overlaying or blending the images. In a composited image, the value of each pixel is computed from the component images.

Three-dimensional (3D) computer graphics generally refers to graphics environments that are rich in color, texture, correct point of view and shadowing. Typical 3D graphics systems generally implement a range of techniques to allow computer graphics developers to create better and more realistic graphics environments. A subset of these techniques is described in further detail below.

The building block of any 3D scene is a polygon. A polygon is a flat shape that is generated using rendered pixels. Triangles, for example, are frequently used to create a variety of shapes. The polygon may be rendered using pixels having a single color resulting in a flat look, or using pixels with shading applied, resulting in a gradation of color so that it appears darker with distance or based upon scene lighting.

In composing the triangles that form the images, each vertex or coordinate has a corresponding color value from a particular color model. A color model is a specification of a 3D color coordinate system and a visible subset in the coordinate system within which all colors in a particular color gamut lie, wherein a color gamut is a subset of all visible chromaticities. For example, the red (R), green (G), blue (B), color model (RGB) is the unit cube subset of the 3D Cartesian coordinate system. The purpose of a color model is to allow convenient specification of colors within some color gamut. The RGB primaries are additive primaries in that the individual contributions of each primary are added together to yield the resultant pixel. The color value of each pixel in a composited multimedia image is computed from the component images in some fashion.

Texture mapping is a technique that allows a 3D developer to create impressive scenes that appear realistic and detailed by scaling and mapping a bitmap image file onto a polygon. Instead of simply shading a polygon red, for example, the use of texture mapping allows a polygon to look like a realistic brick wall. As a technique to display images in a sufficiently realistic manner that represent complex three-dimensional objects, texture mapping involves mapping a source image, referred to as a texture, onto a surface of a three-dimensional object, and thereafter mapping the textured three-dimensional object to the two-dimensional graphics display screen to display the resulting image. Surface detail attributes that are commonly texture mapped include, for example, color, specular reflection, transparency, shadows, and surface irregularities.

Texture mapping may include applying one or more texture map elements of a texture to each pixel of the displayed portion of the object to which the texture is being mapped. (Where pixel is short for 'picture element', texture map element is shorten to 'texel'.) The location of each texel in a texture map may be defined by two or more spatial coordinates and a homogeneous texture effect parameter. For each pixel, the corresponding texel(s) that maps to the pixel is accessed from the texture map via the texel coordinates associated with that pixel. To represent the textured object on the display screen, the corresponding texel is incorporated into the final R, G, B values generated for the pixel. Note that each pixel in an object primitive may not map in a one-to-one correspondence with a single texel in the texture map for every view of the object.

Texture mapping systems typically store data in memory where that data represents a texture associated with the object being rendered. As indicated above, a pixel may map to multiple texels. If it is necessary for the texture mapping system to read a large number of texels that map to a pixel from memory to generate an average value, then a large number of memory reads and the averaging of many texel values would be required. This would undesirably consume time and degrade system performance.

Multum in parvo may translate into "much in little" such as in compression of much into little space. Multum in parvo (MIP) mapping is a technique that is used to improve the visual quality of texture mapping while optimizing performance. The technique works by having multiple texture maps for each texture, each rendered at a different resolution. Different texture maps are then used to represent the image at various distances. In other words, MIP mapping includes creating a series of MIP maps for each texture map and storing in memory the MIP maps of each texture map associated with the object being rendered. A set of MIP maps for a texture map includes a base map that corresponds directly to the texture map as well as a series of related filtered maps, where each successive map is reduced in size by a factor in each of the texture map dimensions. In a sense, each MIP map represents different resolutions of the texture map. Bilinear filtering may also be used to improve the visual quality of texture mapping. Bilinear filtering uses the four surrounding texels from a texture map to more precisely calculate the value of any given pixel in 3D space. Texels are dots within a texture map, while pixels refer to dots on the screen.

Trilinear filtering is a refined filtering technique that takes filtering into the third dimension. With trilinear filtering, the resulting pixel is averaged from the four surrounding texels from the two nearest MIP maps. Trilinear filtering results in an improved visual quality of texture mapping, but requires eight memory reads per pixel, instead of the four memory reads for bilinear filtering, and a calculation to determine which MIP maps from which to read. Accurately calculating this is very expensive. The calculations comprise calculating a Level of Detail (LOD) wherein $$Rho = MAX(\sqrt{(du/dx)^2+(dv/dx)^2}, \sqrt{(du/dy)^2+(dv/dy)^2}),$$

and $$LOD = \log_2 Rho.$$

When simplifying to avoid taking a square root, the equations become, $$Rho' = (Rho)^2 = MAX[(du/dv)^2+(dv/dx)^2, (du/dx)^2+(dv/dx)^2],$$

and $$LOD = \frac{1}{2}\log_2 Rho'.$$

To accurately calculate Rho' at each pixel, multipliers and adders are used to calculate du/dx, dv/dx, du/dy, and dv/dy. Additional multiplers and adders are used to calculate the square of each of these values. In a system with a tremendous amount of processing capability, the cost of performing four additional memory reads may not limit trilinear filtering. In an environment with less processing power, such as a personal computing environment, however, trilinear filtering may not be implemented without affecting performance. It is therefore extremely desirable for an improved cost-effective method of performing trilinear filtering that does not affect performance.

SUMMARY OF THE INVENTION

A method and apparatus for per pixel MIP mapping and trilinear filtering are provided in which the performance of trilinear filtering is improved by reducing the number of computations performed in rendering graphics by computing certain terms only at the beginning of each scanline. In one embodiment, a scanline gradient is calculated once at the beginning of each scanline for each of two texture values with respect to the x-coordinate of the scanline. Following the scanline gradient calculations at the beginning of each scanline, a pixel gradient is calculated for each pixel of the scanline with respect to the y-coordinate of the scanline. The sum of the squares of the scanline gradients and the pixel gradients are compared, and the larger of the two quantities is selected to be a maximum Rho constant term for the corresponding pixel. The maximum Rho constant is used to calculate a Level of Detail (LOD) for each pixel of the scanline. The LOD value for each pixel is used to select a texture map for rendering the corresponding pixel.

In an alternate embodiment, a scanline gradient is calculated once at the beginning of each scanline for each of two texture values. Following the scanline gradient calculations, at the beginning of each scanline, a pixel gradient is calculated for each of two texture values for a first pixel of the scanline with respect to the y-coordinate of the scanline. Derivatives are calculated for the pixel gradients, wherein pixel gradients are found using the derivatives, thereby eliminating the calculation of pixel gradients for each pixel. The sum of the squares of the scanline gradients and the pixel gradients are compared, and the larger of the two quantities is selected to be a maximum Rho constant term for the corresponding pixel. The maximum Rho constant is used to calculate a LOD, and the LOD value for each pixel is used to select a texture map for rendering the corresponding pixel.

BRIEF DESCRIPTION OF THE DRAWINGS

The present invention is illustrated by way of example and not by way of limitation in the figures of the accompanying drawings in which like reference numerals refer to similar elements and in which.

DETAILED DESCRIPTION

The present invention discloses an improved method and apparatus for per pixel MIP mapping and trilinear filtering. In the following detailed description, numerous specific details are set forth in order to provide a thorough understanding of the present invention. It will be apparent to one of ordinary skill in the art that these specific details need not be used to practice the present invention. In other instances, well-known structures, interfaces, and processes have not been shown in detail in order not to unnecessarily obscure the present invention.

Figure 1:
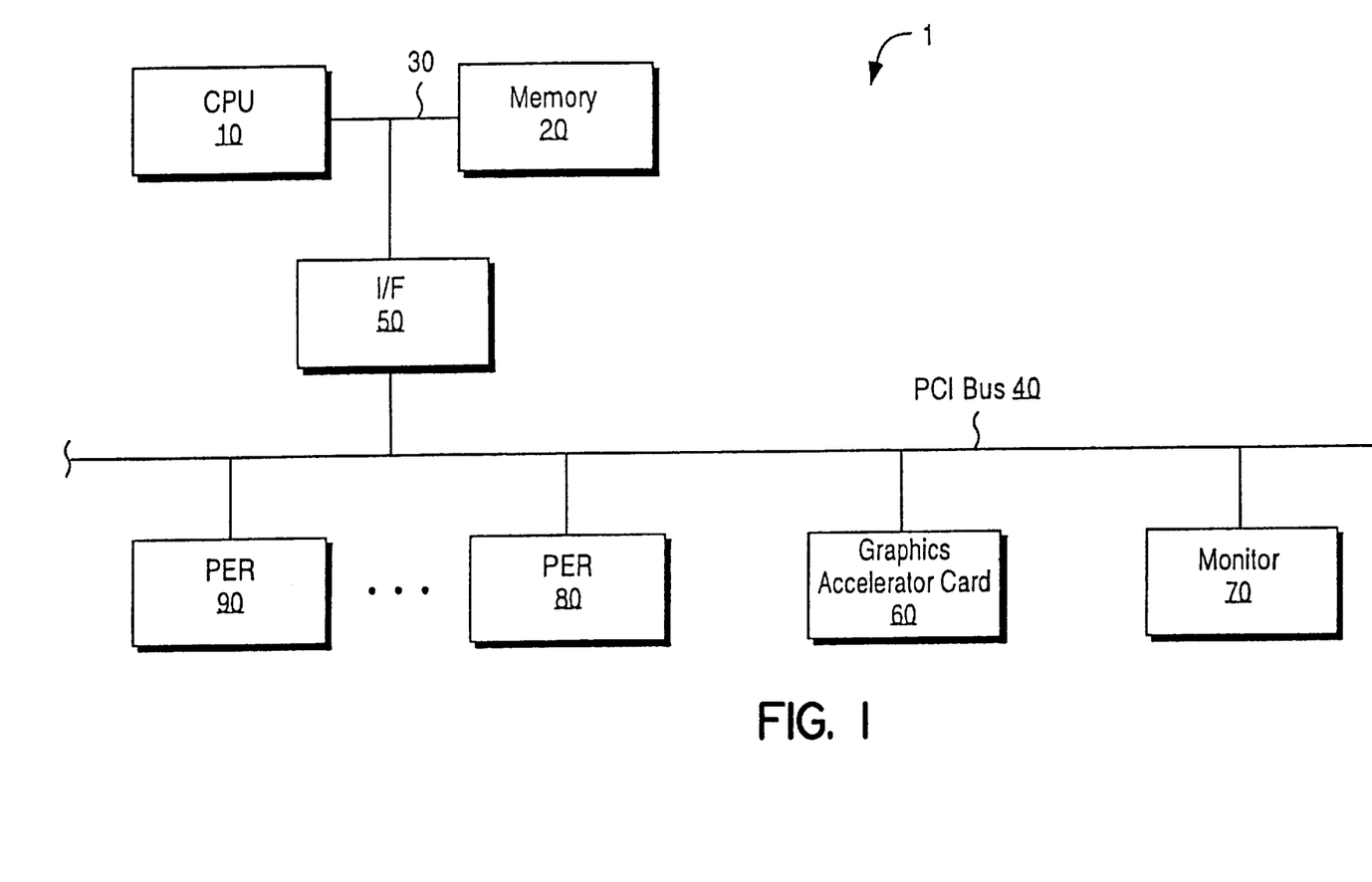
FIG. 1 is one embodiment of a computer system in which the present invention is implemented.

FIG. 1 is one embodiment of a computer system 1 in which the present invention is implemented. The computer system 1 includes a central processing unit (CPU) 10 coupled to system memory 20 by a system bus 30. The CPU 10 and memory 20 are coupled to a peripheral component interconnect (PCI) bus 40 through a bus interface (I/F) 50 via the system bus 30. Coupled to the PCI bus 40 is a graphics/video accelerator card 60, as well as various peripheral (PER) devices 80 and 90. The graphics/video accelerator card 60 is coupled to a display monitor 70.

Figure 2:
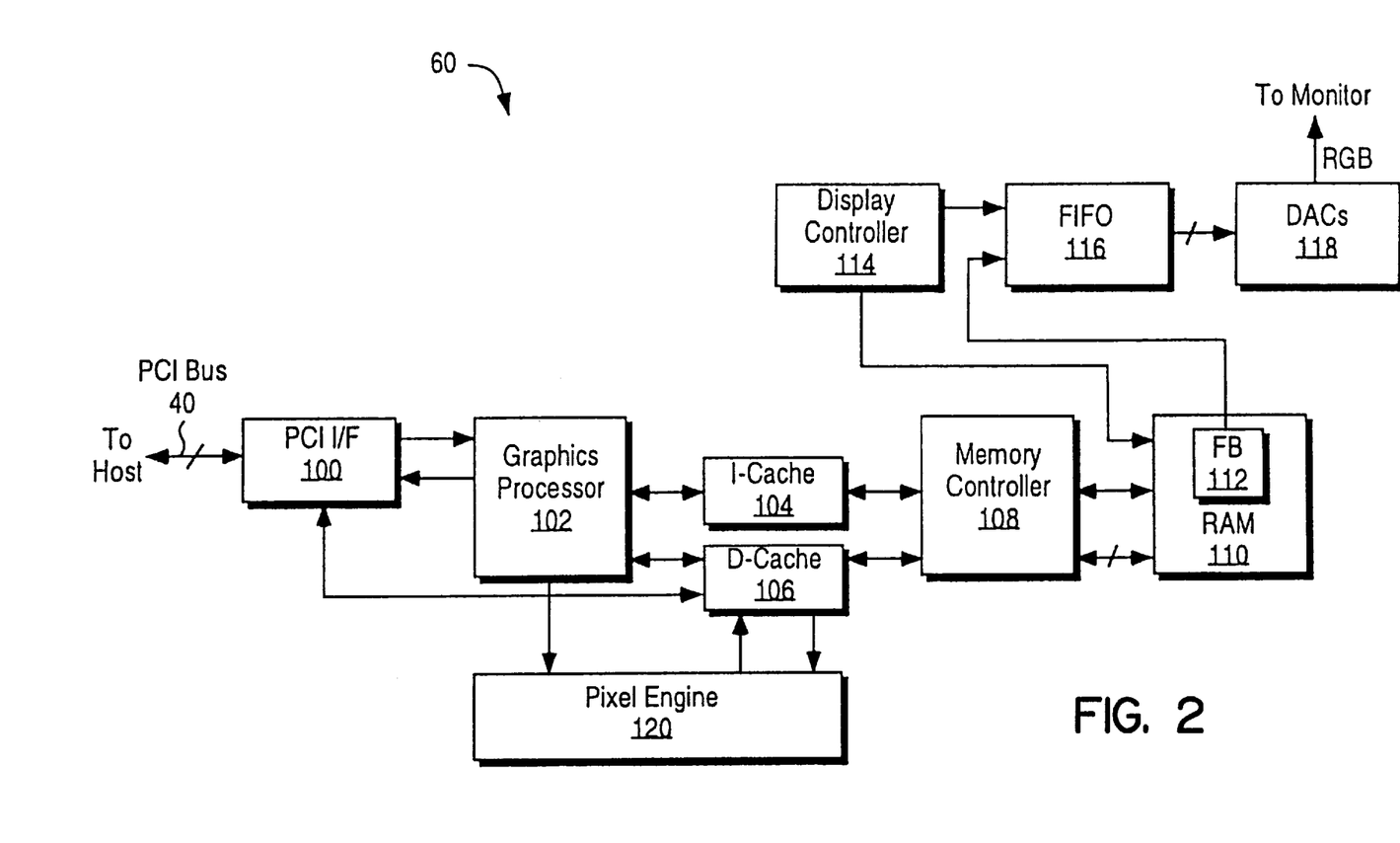
FIG. 2 shows exemplary circuitry included within the graphics/video accelerator card of one embodiment.

FIG. 2 shows exemplary circuitry included within the graphics/video accelerator card 60 of one embodiment, including circuitry for performing various three-dimensional (3D) graphics function. A PCI interface (I/F) 100 couples the graphics/video accelerator card 60 to the PCI bus 40 of FIG. 1. A graphics processor 102 is coupled to the PCI interface 100 and is designed to perform various graphics and video processing functions. The graphics processor 102 is typically a RISC (reduced instruction set computing) processor.

A pixel engine 120 is coupled to the graphics processor 102 and contains circuitry for performing various graphics functions, such as trilinear filtering and MIP mapping, as will be described below. A local random access memory (RAM) 110 stores both source pixel color values and destination pixel color values. Destination color values are stored in a frame buffer (FB) 112 within memory 110. In the preferred embodiment, memory 110 is implemented using dynamic RAM (DRAM). A display controller 114 is coupled to RAM 110 and to a first-in first-out buffer (FIFO) 116. Under the control of the display controller 114, destination color values stored in frame buffer 112 are provided to FIFO 116. Destination values stored in FIFO 116 are provided to a set of digital-to-analog converters (DACs) 118, which output red, green, and blue analog color signals to monitor 70 of FIG. 1.

Also coupled to the RAM 110 is a memory controller 108. Memory controller 108 controls the transfer of data between RAM 110 and both the pixel engine 120 and the graphics processor 102. An instruction cache (I-cache) 104 and a data cache (D-cache) 106 are each coupled to the graphics processor 102 and to the memory controller 108 and are used to store frequently used instructions and data, respectively. The data cache 106 is also coupled to the PCI interface 100 and to the pixel engine 120.

Figure 3:
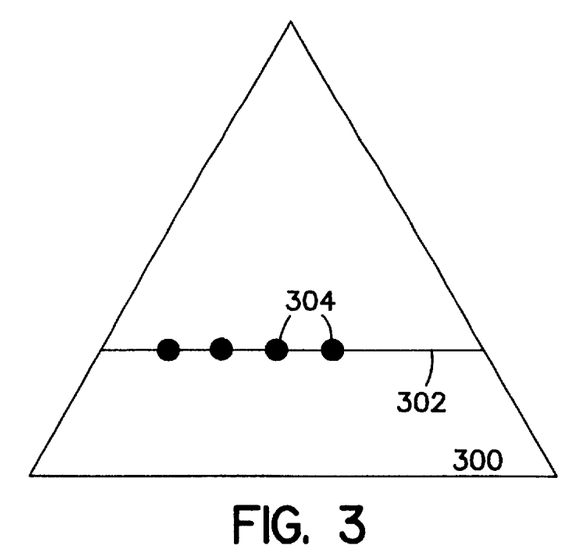
FIG. 3 is a triangle and a corresponding scanline and pixels of one embodiment.

The pixel engine 120 of one embodiment comprises a triangle engine. The triangle engine is used along with a scanline algorithm to render the 3D images. In rendering a 3D image, multiple polygons, or triangles, are formed by rendering multiple pixels. Scanline algorithms are used to render the pixels of the triangle. FIG. 3 is a triangle 300 and a corresponding scanline 302 and pixels 304 of one embodiment. The triangle engine performs all the calculations for rendering the pixels, as will be discussed herein.

Texture mapping is used to add visual detail to synthetic images in computer graphics. The texture mapping of one embodiment comprises a series of spatial transformations, wherein a texture plane, [u, v], is transformed onto a 3D surface, [x, y, z], and then projected onto the output screen, [x, y]. Texture mapping serves to create the appearance of complexity on a pixel by simply applying image detail onto a surface, in much the same way as wallpaper. Textures are generally taken to be images used for mapping color onto the targeted surface. Furthermore, textures are used to perturb surface normals, thus allowing the simulation of bumps and wrinkles without the requirement of modeling such perturbations.

Figure 4:
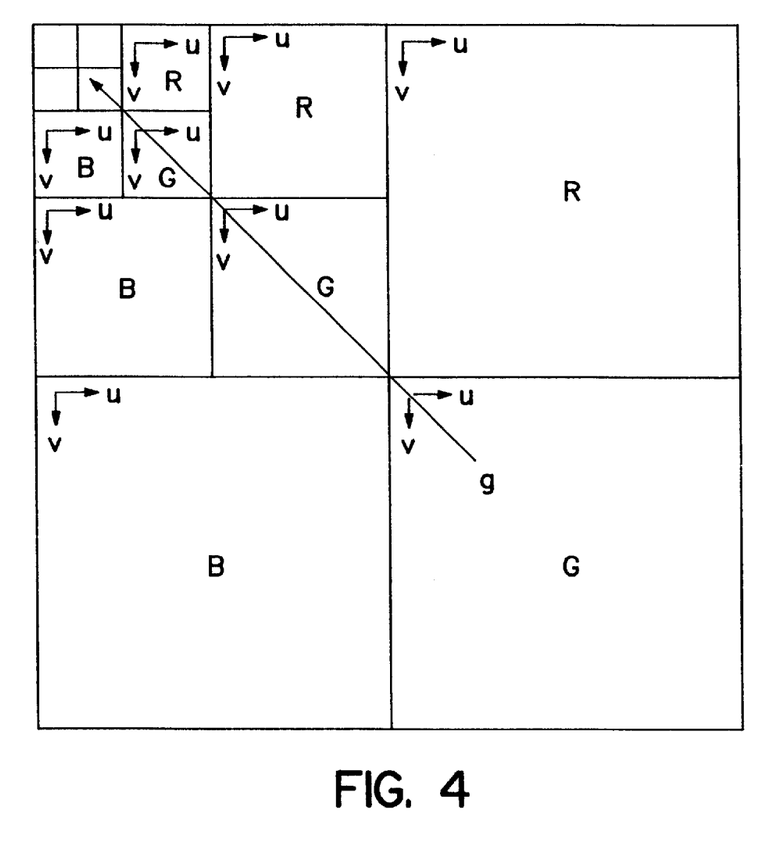
FIG. 4 is a MIP map memory organization of one embodiment using an RGB color model.

In rendering pixels in one embodiment, MIP maps are used to store color images at multiple resolutions in a memory. FIG. 4 is a MIP map memory organization of one embodiment using an RGB color model. The MIP maps support trilinear interpolation, where both intra- and inter-level interpolation can be computed using three normalized coordinates: u, v, and q. Both u and v are spatial coordinates used to access points within texture maps. The q coordinate is used to index, and interpolate between, different levels of the pyramid. In the RGB color model, the quadrants touching the east and south borders contain the original red, green, and blue components of the color image. The remaining upper-left quadrant contains all the lower resolution copies of the original. Each level is indexed by the [u, v, q] coordinate system, but the embodiment is not so limited. Trilinear interpolation, or trilinear filtering, is possible using the [u, V, q] coordinate system. The value of q is chosen using a formula to balance a tradeoff between aliasing and blurring, the formula using a surface projection to compute partial derivatives, wherein $$Rho=MAX[(\delta u/\delta x)^2+(\delta v/\delta x)^2,(\delta u/\delta y)^2+(\delta v/\delta y)^2].$$

In one embodiment, trilinear filtering is used to determine a resultant pixel from four surrounding texels from the two nearest MIP maps. In performing the trilinear filtering of one embodiment, a maximum scale factor, Rho, is used to select a MIP level for use in rendering a particular pixel. The Rho is a maximized ratio of source texels to screen pixels, and Rho is calculated using the formula $$Rho'=(Rho)^2=MAX[(du/dx)^2+(dv/dx)^2,(du/dx)^2+(dv/dx)^2], \quad (1)$$

but the embodiment is not so limited. A Level of Detail (LOD) is the actual MIP level selected and is defined as $$LOD=\tfrac{1}{2}\log_2(Rho'), \quad (2)$$

but the embodiment is not so limited.

The trilinear filtering of one embodiment is implemented by using the Quotient Rule to show $$du/dx=d((u*q)/q)/dx=(q*du_p/dx-u_p*dq/dx)/(q*q), \quad (3)$$

where $u_p=u*q$ (i.e., the perspectively corrected u which is iterated when drawing a triangle). Similarly, it is shown that $$dv/dx=(q*dv_p/dx-vp*dq/dx)/(q*q) \quad (4)$$

$$du/dy=(q*du_p/dy-up*dq/dy)/(q*q), \text{ and} \quad (5)$$

$$dv/dy=(q*dv_p/dy-vp*dq/dy)/(q*q). \quad (6)$$

According to an embodiment of the present invention, based on the above definitions, the following terms are defined:

$$c1=(q*du_p/dx-u_p*dq/dx), \quad (7)$$

$$c2=(q*dv_p/dx-v_p*dq/dx), \quad (8)$$

$$c3=(q*du_p/dy-u_p*dq/dy), \text{ and} \quad (9)$$

$$c4=(q*dv_p/dy-v_p*dq/dy) \quad (10)$$

wherein u and v are texture values, x and y are screen position values of a texel, and q is a distance value. Therefore, using equations 7–10, it is shown that $$Rho'=MAX[(c1*c1+c2*c2)/(q*q*q*q), \quad (11)$$

$$(c3*c3+c4*c4)/(q*q*q*q)], \quad (12)$$

which implies that $$Rho'=MAX[(c1*c1+c2*c2), (c3*c3+c4*c4)]/(q*q*q*q), \quad (13)$$

and $$LOD=\tfrac{1}{2}\log_2(Rho')=\tfrac{1}{2}\log_2[MAX(c1^2+c2^2,c3^2+c4^2)/q^4]$$

$$=\tfrac{1}{2}\log_2 MAX(c1^2+c2^2,c3^2+c4^2)-\tfrac{1}{2}\log_2 q^4$$

$$=\tfrac{1}{2}\log_2 MAX(c1^2+c2^2,c3^2+c4^2)-2\log_2 q. \quad (14)$$

According to a first embodiment of the present invention, the performance of trilinear filtering is improved by reducing the number of computations performed in rendering graphics by computing certain terms only at the beginning of each scanline, instead of at every point in a triangle. The derivatives of c1 and c2 in the above equations are zero, thus proving that c1 and c2 are constants along a scanline, wherein a scanline is defined as having a single value along the y-axis and an increasing or decreasing value along the x-axis. Thus, according to one embodiment, the scanline gradient quantity (c1*c1+c2*c2) is only calculated once at the beginning of each scanline while the pixel gradient quantity (c3*c3+c4*c4) is calculated for each point, or pixel, along the scanline. As the quantity (c1*c1+c2*c2) only has to be calculated once for each scanline, and the calculations of the quantity (c3*c3+c4*c4) follow this calculation for each pixel along the scanline, this embodiment allows the same multiplier units to be used in calculating the quantity (c1*c1+c2*c2) and the quantity (c3*c3+c4*c4) because these values are not being computed at the same time.

Figure 5:
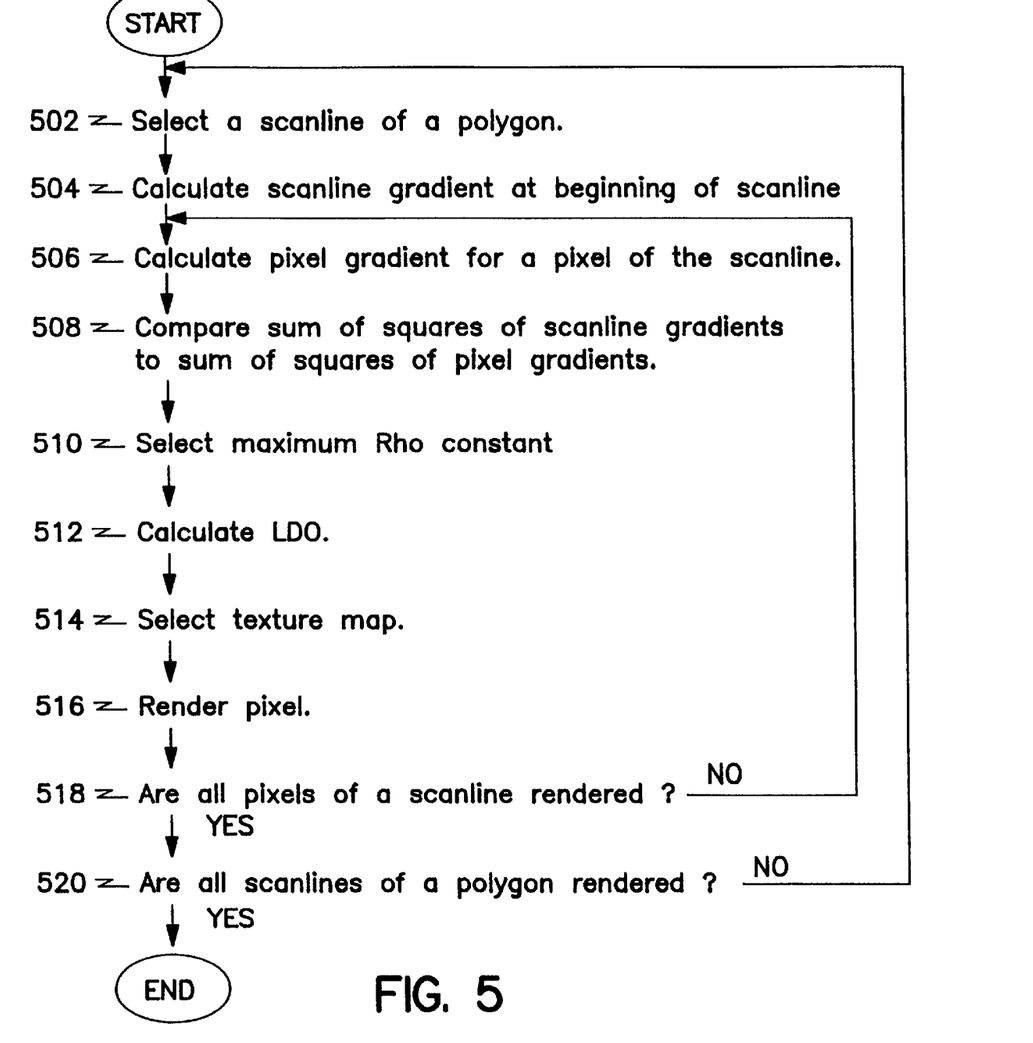
FIG. 5 is a flowchart for pixel rendering using the trilinear filtering of a first embodiment.

FIG. 5 is a flowchart for pixel rendering using the trilinear filtering of a first embodiment. Operation begins at step 502, at which a scanline of a polygon is selected for rendering. An example would be scanline 302 of FIG. 3. At the beginning of each scanline a triangle engine calculates a scanline gradient for each of two texture values (u, v) with respect to the x-coordinate of the scanline, at step 504, using equations 7 and 8. A scanline gradient may be thought of as reflecting the rate of change of texture coordinates relative to pixel coordinates. The quantity (c1*c1+c2*c2) is calculated using the scanline gradients. In one embodiment, these calculations are performed using six multiply operations, two subtract operations, and one add operation for each scanline, but the embodiment is not so limited. As this embodiment uses six multipliers, Rho may be computed in a single clock cycle.

Following the scanline gradient calculations at the beginning of each scanline, the triangle engine calculates a pixel gradient for each pixel of the scanline, at step 506, with respect to the y-coordinate of the scanline. The pixel gradient is calculated for each of two texture values using equations 9 and 10. The quantity (c3*c3+c4*c4) is calculated using the pixel gradients. At step 508, the quantity (c1*c1+c2*c2) is compared to the quantity (c3*c3+c4*c4); the larger of the two quantities is selected, at step 510, MAX [(c1*c1+c2*c2), (c3*c3+c4*c4)] to be a maximum Rho constant term for the corresponding pixel. In one embodiment, the maximum Rho constant calculations are performed using six multiply operations, two subtract operations, one add operation, and one compare operation for each pixel, but the embodiment is not so limited.

Following determination of the maximum Rho constant, the triangle engine calculates the level of detail (LOD) for each pixel of the scanline, at step 512, using equation 2. The LOD value for each pixel is used to select a texture map for rendering the corresponding pixel, at step 514. The pixel is rendered, at step 516. At step 518, a determination is made as to whether all pixels of a scanline have been rendered. If all pixels of the current scanline have not been rendered, operation continues at step 506, at which pixel gradients are calculated for another pixel of the scanline. If all pixels of the current scanline have been rendered, operation continues at step 520, at which a determination is made as to whether all scanlines of the current polygon have been rendered. If all scanlines of the current polygon have not been rendered, operation continues at step 502, at which a new scanline of the polygon is selected for rendering. If all scanlines of the current polygon have been rendered, operation on the current polygon ends.

According to a second embodiment of the present invention, the performance of trilinear filtering is improved by reducing the number of computations performed in rendering graphics by computing certain terms only at the beginning of each scanline, instead of at every point in a triangle. As previously discussed herein, c1 and c2 are constants along a scanline; thus, the quantity (c1*c1+c2*c2) is only calculated once at the beginning of each scanline. It is further noted that c3 and c4 in equations 9 and 10 are linear quantities. Therefore, if the quantity (c3*c3+c4*c4) is calculated at pixel (x, y), the beginning of a scanline, then at pixel (x+1, y), the next pixel on the scanline, $$(c3*c3+c4*c4)$$
$$=[(c3+\text{delta}\_c3)*(c3+\text{delta}\_c3)+(c4+\text{delta}\_c4)*(c4+\text{delta}\_c4)]$$
$$=[c3*c3+2*c3*\text{delta}\_c3+\text{delta}\_c3*\text{delta}\_c3+c4*c4+2*c4*\text{delta}\_c4+\text{delta}\_c4*\text{delta}\_c4], \quad (15)$$

and at pixel (x+2, y), $$(c3*c3+c4*c4)$$
$$=[(c3+\text{delta}\_c3)*(c3+\text{delta}\_c3)+(c4+\text{delta}\_c4)*(c4+\text{delta}\_c4)]$$
$$=[c3*c3+4*c3*\text{delta}\_c3+4*\text{delta}\_c3*\text{delta}\_c3+c4*c4+4*c4*\text{delta}\_c4+4*\text{delta}\_c4*\text{delta}\_c4]. \quad (16)$$

Therefore, if the derivatives of c3 and c4 are calculated at the beginning of each scanline, then c3 and c4 are not calculated for each pixel along the scanline.

Figure 6:
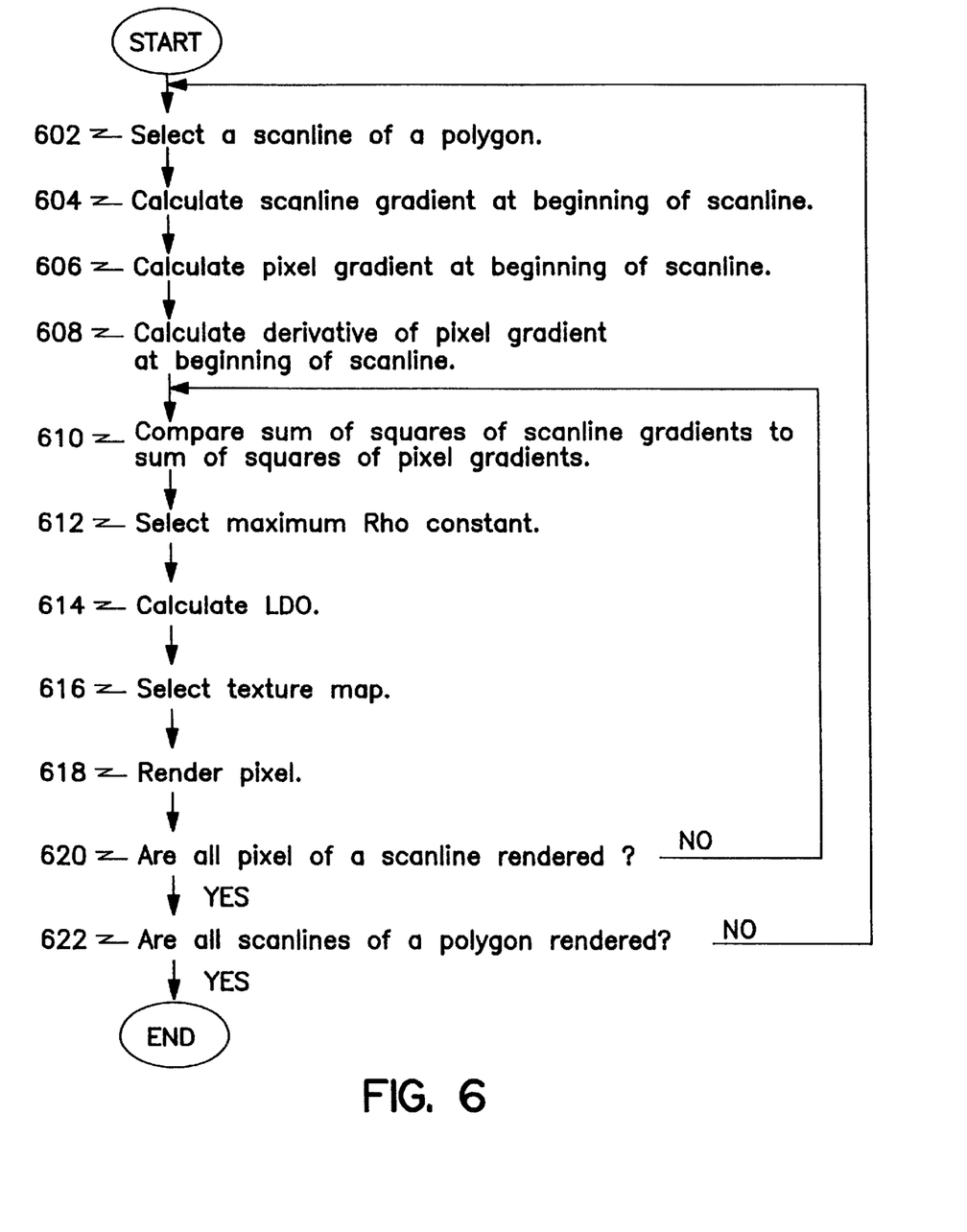
FIG. 6 is a flowchart for pixel rendering using the trilinear filtering of a second embodiment.

FIG. 6 is a flowchart for pixel rendering using the trilinear filtering of a second embodiment. Operation begins at step 602, at which a scanline of a polygon is selected for rendering. At the beginning of each scanline a triangle engine calculates a scanline gradient for each of two texture values with respect to the x-coordinate of the scanline, at step 604, using equations 7 and 8. The quantity (c1*c1+c2*c2) is calculated using the scanline gradients. Following the scanline gradient calculations, at the beginning of each scanline, the triangle engine calculates a pixel gradient for a first pixel of the scanline, at step 606, with respect to the y-coordinate of the scanline. The pixel gradient is calculated for each of two texture values using equations 9 and 10. Derivatives are calculated, at step 608, for the pixel gradients according to the formulas $$\text{delta}\_c3=(dq/dx*du_p/dy-du_{p/dx}*dq/dy), \quad (17)$$
$$\text{delta}\_c4=(dq/dx*dv_p/dy-dv_{p/dx}*dq/dy), \quad (18)$$

and equation 15. The pixel gradients are found for each pixel using the derivatives, thereby eliminating the separate calculation of pixel gradients for each pixel. The quantity (c1*c1+c2*c2) is calculated using the scanline gradients, and the quantity (c3*c3+c4*c4) is calculated using the pixel gradients. In one embodiment, these calculations are performed using 20 multiply operations, six subtract operations, five add operations, and two left-shift operations for each scanline, but the embodiment is not so limited. In one embodiment, ten multipliers are used to compute the maximum Rho constant over two clock cycles for each scanline, and the computations may be performed for successive scanlines while the pixels are rendered for the current scanline.

At step 610, the quantity (c1*c1+c2*c2) is compared to the quantity (c3*c3+c4*c4); the larger of the two quantities is selected, at step 612, to be the maximum Rho constant term for the corresponding pixel. In one embodiment, the maximum Rho constant calculations are performed using two add operations and one compare operation for each pixel, but the embodiment is not so limited.

Following determination of the maximum Rho constant, the triangle engine calculates the LOD for each pixel of the scanline, at step 614, using equation 2. The LOD value for each pixel is used to select a texture map for rendering the corresponding pixel, at step 616. The pixel is rendered, at step 618. At step 620, a determination is made as to whether all pixels of a scanline have been rendered. If all pixels of the current scanline have not been rendered, operation continues at step 610. If all pixels of the current scanline have been rendered, operation continues at step 622, at which a determination is made as to whether all scanlines of the current polygon have been rendered. If all scanlines of the current polygon have not been rendered, operation continues at step 602, at which a new scanline of the polygon is selected for rendering. If all scanlines of the current polygon have been rendered, operation on the current polygon ends.

Thus, a method and apparatus for per pixel MIP mapping and trilinear filtering is disclosed. These specific arrangements and methods described herein are merely illustrative of the principles of the present invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

What is claimed is:

1. A method of generating three-dimensional graphics, comprising:
   presenting at least one scanline, each scanline having a plurality of pixels;
   calculating a scanline gradient no more than once for each scanline;
   calculating a maximum scale factor for each pixel by using the scanline gradient and at least one of a pixel gradient and a derivative of a pixel gradient;
   selecting one of a plurality of texture maps by employing the maximum scale factor; and
   rendering a pixel from the selected texture map.

2. The method of claim 1, wherein calculating a scanline gradient no more than once for each scanline includes calculating a scanline gradient for each of two texture values and includes using the formulas $$c1=(q*du_p/dx-u_p*dq/dx),$$

$$c2=(q*dv_p/dx-v_p*dq/dx),$$

wherein u and v are texture values, x and y are screen position values of a texel, and q is a distance value.

3. The method of claim 1, each scanline further having a second position coordinate, the second position coordinate having a plurality of texture values and wherein calculating a maximum scale factor includes using a pixel gradient.

4. The method of claim 3, wherein using a pixel gradient includes calculating a pixel gradient for each of two texture values and using the formulas $$c3=(q*du_p/dy-u_p*dq/dy),$$

$$c4=(q*dv_p/dy-v_p*dq/dy),$$

wherein u and v are texture values, x and y are screen position values of a texel, and q is a distance value.

5. The method of claim 4, wherein the maximum scale factor is Rho, wherein Rho is the maximized ratio of texels to pixels, and wherein Rho is calculated using the formula $$\text{Rho}'=\text{MAX}((c1*c1+c2*c2), (c3*c3+c4*c4))/(q*q*q*q).$$

6. The method of claim 1, each pixel having at least one texture value, wherein
   using a derivative of a pixel gradient includes calculating a derivative of a pixel gradient once for each scanline for each texture value and
   wherein calculating a maximum scale factor includes using a derivative of a pixel gradient.

7. The method of claim 6, wherein calculating a derivative of a pixel gradient includes calculating a derivative of a pixel gradient for each of two texture values and includes using the formulas $$\text{delta}\_c3=(dq/dx*du_p/dy-du_p/dx*dq/dy),$$

$$\text{delta}\_c4=(dq/dx*dv_p/dy-dv_p/dx*dq/dy),$$

wherein u and v are texture values, x and y are screen position values of a texel, and q is a distance value.

8. The method of claim 1, prior to selecting one of a plurality of texture maps, the method further comprising:
   generating a texture map for each of a plurality of textures, wherein each texture map is generated at a different resolution.

9. The method of claim 3, wherein the first position coordinate is an X-coordinate and the second position coordinate is a Y-coordinate.

10. The method of claim 5, further comprising:
    calculating a level of detail (LOD), wherein $$LOD=(\tfrac{1}{2})\log_2(\text{Rho}'),$$

and
    wherein selecting one of a plurality of texture maps includes employing the calculated level of detail.

11. A computer system comprising:
    a memory;
    a processor subsystem coupled to the memory, wherein the processor subsystem is adapted to perform a method, including
        presenting at least one scanline, each scanline having a plurality of pixels;
        calculating a scanline gradient no more than once for each scanline;
        calculating a maximum scale factor for each pixel by using the scanline gradient and at least one of a pixel gradient and a derivative of a pixel gradient;
        selecting one of a plurality of texture maps by employing the maximum scale factor; and
        rendering a pixel from the selected texture map.

12. The computer system of claim 11, wherein calculating a scanline gradient no more than once for each scanline includes calculating a scanline gradient for each of two texture values and includes using the formulas $$c1=(q*du_p/dx-u_p*dq/dx),$$

$$c2=(q*dv_p/dx-v_p*dq/dx),$$

wherein u and v are texture values, x and y are screen position values of a texel, and q is a distance value.

13. The computer system of claim 11, each scanline further having a second position coordinate, the second position coordinate having a plurality of texture values and wherein calculating a maximum scale factor includes using a pixel gradient.

14. The computer system of claim 13, wherein using a pixel gradient includes calculating a pixel gradient for each of two texture values and using the formulas $$c3=(q*du_p/dy-u_p*dq/dy),$$

$$c4=(q*dv_p/dy-v_p*dq/dy),$$

wherein u and v are texture values, x and y are screen position values of a texel, and q is a distance value.

15. The computer system of claim 14, wherein the maximum scale factor is Rho, wherein Rho is the maximized ratio of texels to pixels, and wherein Rho is calculated using the formula $$\text{Rho}'=\text{MAX}((c1*c1+c2*c2), (c3*c3+c4*c4))/(q*q*q*q).$$

16. The computer system of claim 11, each pixel having at least one texture value,
    using a derivative of a pixel gradient includes calculating a derivative of a pixel gradient once for each scanline for each texture value and
    wherein calculating a maximum scale factor includes using a derivative of a pixel gradient.

17. The computer system of claim 16, wherein calculating a derivative of a pixel gradient includes calculating a derivative of a pixel gradient for each of two texture values and includes using the formulas $$\text{delta}\_c3=(dq/dx*du_p/dy-du_{p/dx}*dq/dy),$$

$$\text{delta\_c4} = (dq/dx * dv_p/dy - dv_p/dx * dq/dy),$$

wherein u and v are texture values, x and y are screen position values of a texel, and q is a distance value.

18. The computer system of claim 11, prior to selecting one of a plurality of texture maps, the processor subsystem performs the method, further including
generating a texture map for each of a plurality of textures, wherein each texture map is generated at a different resolution; and
calculating a level of detail (LOD), wherein $$LOD = (\tfrac{1}{2})\log_2(\text{Rho}'),$$

and
wherein selecting one of a plurality of texture maps includes employing the calculated level of detail.

19. A computer readable medium containing executable instructions which, when executed in a processing system, causes the system to perform the steps for generating three-dimensional (3D) graphics comprising:
   presenting at least one scanline, each scanline having a plurality of pixels;
   calculating a scanline gradient no more than once for each scanline;
   calculating a maximum scale factor for each pixel by using the scanline gradient and at least one of a pixel gradient and a derivative of a pixel gradient;
   selecting one of a plurality of texture maps by employing the maximum scale factor; and
   rendering a pixel from the selected texture map.

20. The computer readable medium of claim 19, wherein calculating a scanline gradient no more than once for each scanline includes calculating a scanline gradient for each of two texture values and includes using the formulas $$c1 = (q * du_p/dx - u_p * dq/dx),$$

$$c2 = (q * dv_p/dx - v_p * dq/dx),$$

wherein u and v are texture values, x and y are screen position values of a texel, and q is a distance value.

21. The computer readable medium of claim 19, each scanline further having a second position coordinate, the second position coordinate having a plurality of texture values and wherein calculating a maximum scale factor includes using a pixel gradient.

22. The computer readable medium of claim 21, wherein using a pixel gradient includes calculating a pixel gradient for each of two texture values and using the formulas $$c3 = (q * du_p/dy - u_p * dq/dy),$$

$$c4 = (q * dv_p/dy - v_p * dq/dy),$$

wherein u and v are texture values, x and y are screen position values of a texel, and q is a distance value.

23. The computer readable medium of claim 22, wherein the maximum scale factor is Rho, wherein Rho is the maximized ratio of texels to pixels, wherein the instructions cause the system to calculate Rho according to the formula $$\text{Rho}' = \text{MAX}((c1*c1 + c2*c2), (c3*c3 + c4*c4))/(q*q*q*q).$$

24. The computer readable medium of claim 19, each pixel having at least one texture value, wherein
   using a derivative of a pixel gradient includes calculating a derivative of a pixel gradient once at the beginning of each scanline for each of the plurality of texture values and wherein calculating a maximum scale factor includes using a derivative of a pixel gradient.

25. The computer readable medium of claim 24, wherein calculating a derivative of a pixel gradient includes calculating a derivative of a pixel gradient for each of two texture values and includes using the formulas $$\text{delta\_c3} = (dq/dx * du_p/dy - du_{p/dx} * dq/dy),$$

$$\text{delta\_c4} = (dq/dx * dv_p/dy - dv_p/dx * dq/dy),$$

wherein u and v are texture values, x and y are screen position values of a texel, and q is a distance value.

26. The computer readable medium of claim 19, prior to selecting one of a plurality of texture maps, the instructions cause the system to performs the method, further including
generating a texture map for each of a plurality of textures, wherein each texture map is generated at a different resolution; and
calculating a level of detail (LOD), wherein $$LOD = (\tfrac{1}{2})\log_2(\text{Rho}'),$$

and
wherein selecting one of a plurality of texture maps includes employing the calculated level of detail.

27. A method to generate three-dimensional graphics, comprising:
   (i) presenting at least one polygon that defines at least one scanline S, each scanline having at least one pixel P, wherein each pixel P includes at least one texture value;
   (ii) setting $v_{SCLN} = 0$ and setting $v_{PIX} = 0$, wherein $v_{SCLN}$ and $v_{PIX}$ each represent an increment value;
   (iii) setting $SCLN = v_{SCLN} + 1$, wherein SCLN represents the number of the scanline;
   (iv) setting $PIX_{SCLN} = v_{PIX} + 1$, wherein $PIX_{SCLN}$ represents the number of the pixel on that scanline;
   (v) if $PIX_{SCLN} = 1$, then calculating a scanline gradient for each texture value;
   (vi) calculating a pixel gradient for each texture value;
   (vii) calculating a maximum scale factor (Rho) by using the scanline gradient and at least one of the pixel gradient and a derivative of the pixel gradient;
   (viii) calculating a level of detail (LOD) using the maximum scale factor;
   (ix) selecting a texture map using the level of detail;
   (x) rendering the pixel $PIX_{SCLN}$ from the selected texture map;
   (xi) (a) setting $z_{PIX} = P - PIX_{SCLN}$, where $x_{PIX}$ is an incremental value, and
   (xi) (b) setting $v_{PIX} = v_{PIX} + 1$;
   (xii) (a) if $z_{PIX} > 0$, repeating steps (iv) through (xii);
   (xii) (b) if $z_{PIX} = 0$, (1) setting $z_{SCLN} = S - SCLN$, where $z_{SCLN}$ is an incremental value, and (2) setting $v_{SCLN} = v_{SCLN} + 1$; and
   (xiii) if $Z_{SCLN} > 0$, repeating steps (iii) through (xiii).

28. The method of claim 27, wherein calculating a scanline gradient for each texture value includes employing the formulas, $$c1 = (q * du_p/dx - u_p * dq/dx),$$

and $$c2 = (q * dv_p/dx - v_p * dq/dx).$$

29. The method of claim 27, wherein calculating a pixel gradient for each texture value includes employing the formulas, $$c3=(q*du_p/dy-u_p*dq/dy),$$

and $$c4=(q*dv_p/dy-v_p*dq/dy).$$

30. The method of claim 27, wherein only if SCLN=1, then (vi) calculating a pixel gradient for each texture value, the method further comprising:
(vi) (a) calculating a derivative of the pixel gradient for each texture value.

31. The method of claim 30, wherein calculating a pixel gradient for each texture value includes employing the formulas, $$c3=(q*du_p/dy-u_p*dq/dy),$$

and $$c4=(q*dv_p/dy-v_p*dq/dy),$$

and wherein calculating a derivative of the pixel gradient for each texture value includes employing the formulas, $$\text{delta\_}c3=(dq/dx*du_p/dy-du_{p/dx}*dq/dy),$$

and $$\text{delta\_}c4=(dq/dx*dv_p/dy-dv_p/dx*dq/dy).$$

\* \* \* \* \*